United States Patent

[11] 3,610,666

| [72] | Inventor | Truman V. Tyler<br>5383 Rolling Ridge Road, Palos Verdes Estates, Calif. 90274 |
|---|---|---|
| [21] | Appl. No. | 798,346 |
| [22] | Filed | Feb. 11, 1969 |
| [45] | Patented | Oct. 5, 1971 |

[54] FLUID COUPLING
5 Claims, 5 Drawing Figs.

[52] U.S. Cl. ........................................... 285/337,
285/343, 285/346, 285/351, 285/368, 285/369
[51] Int. Cl. ............................................ F16l 23/00
[50] Field of Search ............................. 285/337,
369, 345, 351, 413, 368, 346, 343

[56] References Cited
UNITED STATES PATENTS

| 400,644 | 4/1889 | Dresser | 285/337 X |
|---|---|---|---|
| 1,622,768 | 3/1927 | Cook et al. | 285/369 X |
| 2,288,904 | 7/1942 | Hudson | 285/337 X |
| 3,393,932 | 7/1968 | Howe | 285/369 |
| 2,163,810 | 6/1939 | Raybould | 285/337 X |
| 3,352,579 | 11/1967 | Hoke | 285/337 |

FOREIGN PATENTS

| 1,201,165 | 7/1959 | France | 285/337 |
|---|---|---|---|

*Primary Examiner*—Dave W. Arola
*Attorney*—Gausewitz & Carr

ABSTRACT: This invention provides a pipe-coupling arrangement that includes a gasket around each of the pipes to be connected, the gaskets having outwardly tapered surfaces engaged by members outwardly of them, with a provision being made for compressing the gaskets to wedge them against the surfaces of the pipes. One of the gaskets may include an outwardly tapered portion for sealing against a surrounding part when the gaskets are compressed, or a separate O-ring may be used for this purpose. The inclusion of sealed telescoping sleeves provides for an expansion coupling.

PATENTED OCT 5 1971

INVENTOR.
TRUMAN V. TYLER
BY

ATTORNEYS

INVENTOR.
TRUMAN V. TYLER

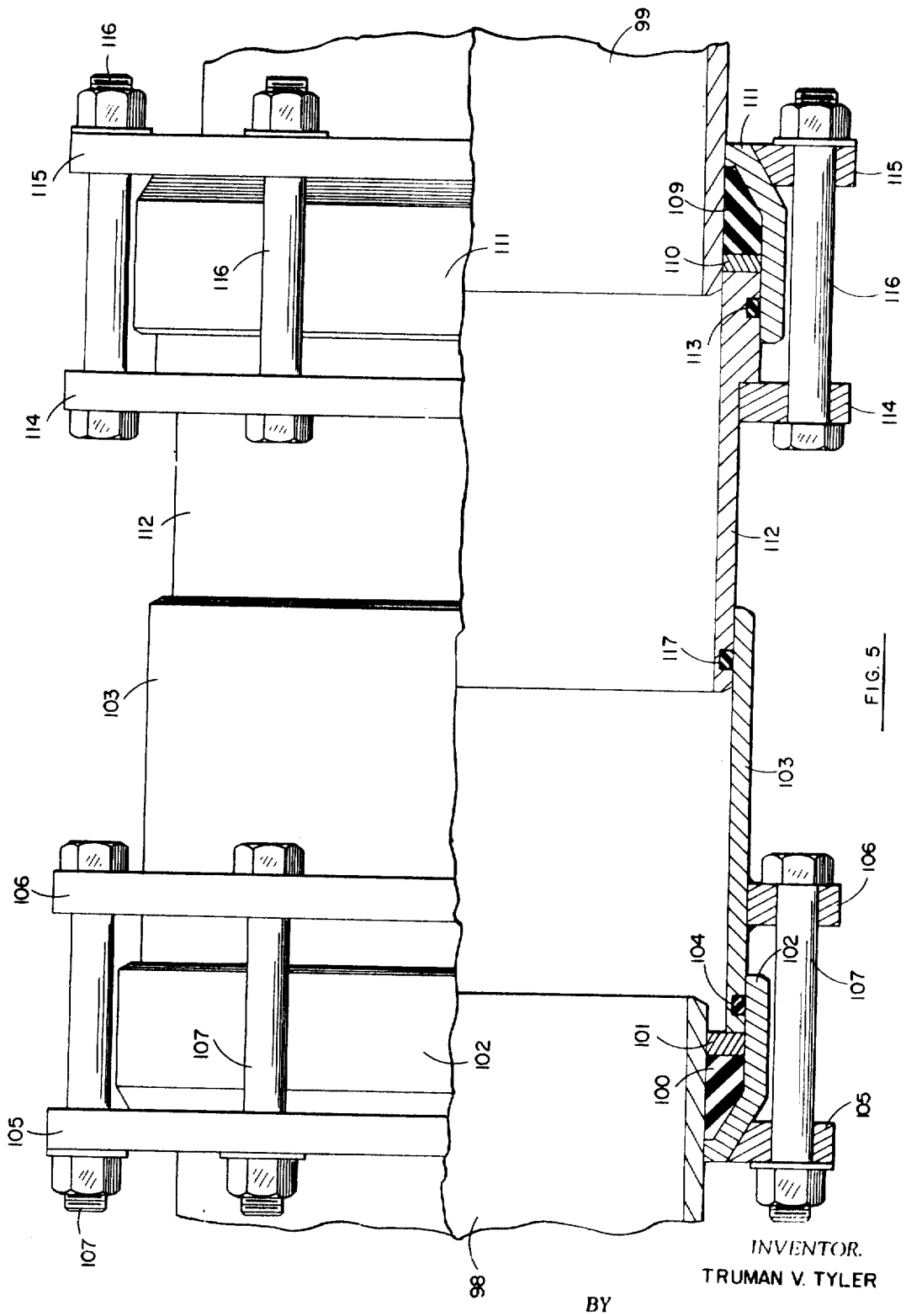

3,610,666

FLUID COUPLING

BACKGROUND OF THE INVENTION

1. The Field of the Invention

This invention relates to a sealed coupling for tubular members.

2. The Prior Art

A need has existed in the field of coupling devices for pipes for improved designs, particularly from the standpoint of cost reduction and the ability to withstand internal pressures. Conventional designs are relatively complex, expensive to manufacture and to install. For example, for couplings used in repair in oil refineries, the assembly includes a sleeve that fits around the adjacent ends of the pipes to be coupled, and through which extend different sets of screws. A set at either end is tightened to cause internal gaskets to become compressed to effect seals with the peripheries of the pipes. Another set of screws is tightened to effect a temporary attachment to the pipe ends prior to welding of the assembly in place to form a permanent attachment. Regulations require that, when the coupling is installed, the exposed screwheads cannot remain, so they must be cut off and a weld made at each of the screw openings. Obviously, this is an extremely laborious, expensive and time-consuming operation.

SUMMARY OF THE INVENTION

According to the present invention, a greatly simplified coupling is provided, which is of lower cost manufacture and much easier installation than the ordinary design. It is versatile and suitable for a wide variety of purposes when constructed in different versions. In one arrangement suitable for repair in oil refineries, the coupling includes a central annular member circumscribing the adjacent pipe ends, outwardly of which are gaskets circumscribing the pipes. The gaskets include surfaces that are inclined radially and axially inwardly. These surfaces are engaged by members that are movable relatively toward each other, which cause the gaskets to be compressed against surfaces of the pipes in accomplishing seals therewith. Setscrews through the annular member engage the surfaces of the pipes and accomplish a temporary attachment. These are covered by an extension of one of the gasket-engaging members so that they are not exposed to the exterior and need not be removed when the coupling installation is complete.

One of the gaskets may include a surface that inclines axially inwardly and radially outwardly so that it is compressed against the extension when the members are moved toward each other to form a seal at that location. Alternatively, there may be an additional seal, such as an O-ring, between the extension and the other gasket-engaging member. The O-ring seal is satisfactory because the coupling members easily may be made to have accurately machined smooth surfaces, while the pipes have rough exteriors which require gaskets to be compressed against them to accomplish seals. The force to move the members toward each other in compressing the gaskets may be provided by screws or bolts extending through flanges on the two members. These bolts may be removed rather than cut off and welded when the installation is complete. Also, the flanges may be made in sections so that they, too, are removable and reusable after the coupling has been installed.

For ordinary coupling use, other than that for oil refineries, the bolts or screws may be left in position permanently to hold the coupling sections together. Also, the temporary attachment of the setscrews is eliminated. Such a coupling may include extensions from both of the gasket-engaging members overlapping the central member, with an O-ring being provided at either overlapping portion to prevent leakage at the relatively movable parts.

An expansion coupling also may be provided in which an individual means for loading the gasket by compressing it may be provided at either of the pipe ends. Telescoping members extend from these individual elements, with an O-ring seal being provided where the telescoping members overlap. This allows relative axial movement of the pipe ends.

An object of this invention is to provide an improved device for producing a sealed interconnection of adjacent ends of tubular members.

Another object of this invention is to provide a pipe-coupling device in which increased pressures are used to enhance the sealing effect of the gaskets of the coupling, rather than tending to cause leakage.

Yet another object of this invention is to provide a pipe-coupling device of relatively simple and low cost construction, and which is more easily and quickly installed than conventional couplings.

An additional object of this invention is to provide a pipe-coupling device which may be welded in place without requiring the cutting off or welding of screws to complete the installation.

A further object of this invention is to provide a pipe-coupling device having reusable components for compressing the gaskets.

A still further object of this invention is to provide a pipe-coupling device having versatility, which can be made in different versions for a wide variety of uses, including construction as an expansion coupling to allow axial movement of the adjacent pipe ends.

BRIEF DESCRIPTION OF THE DRAWING

FIG. 5 is a longitudinal sectional view, partially in elevation, of an expansion-type coupling.

DESCRIPTION OF THE PREFERRED EMBODIMENTS

Figure 1:
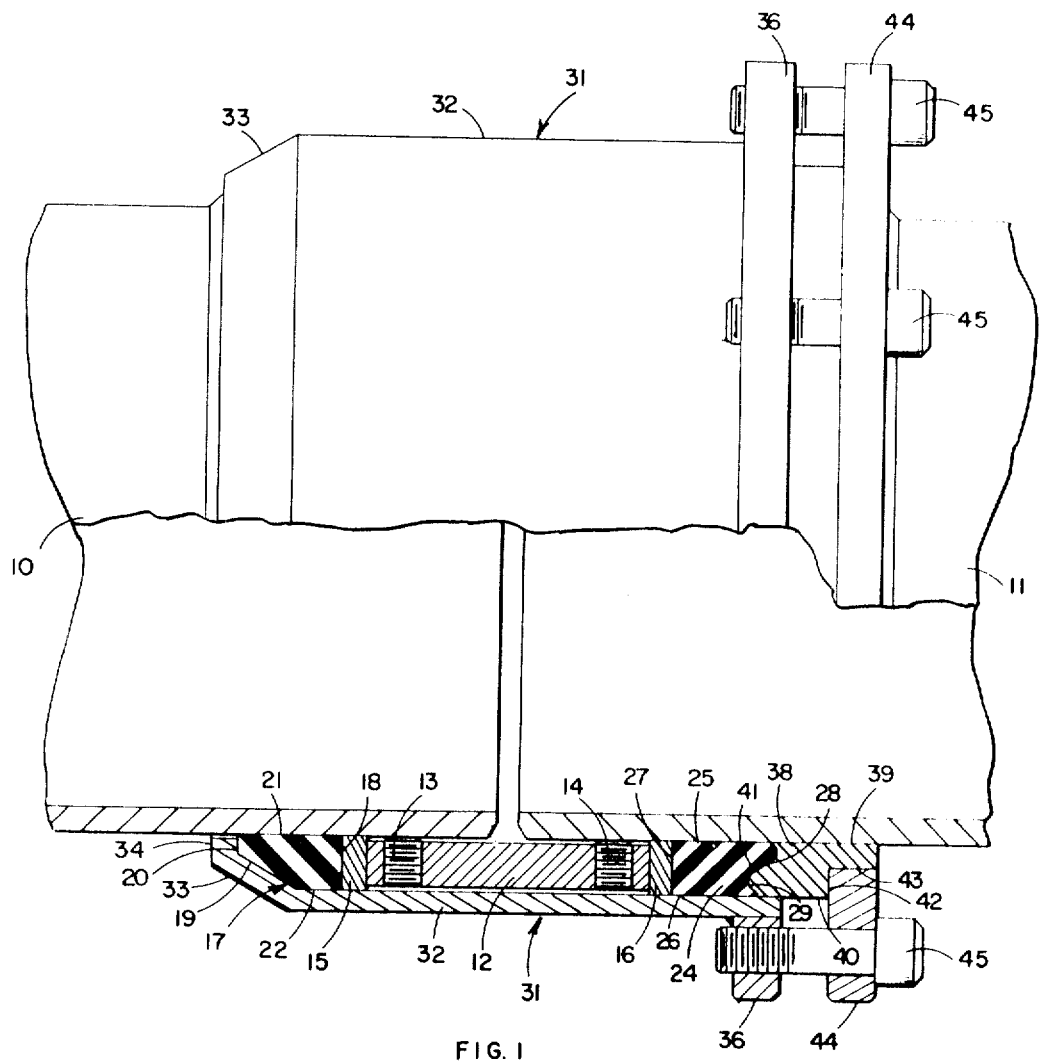
FIG. 1 is a longitudinal sectional view, partially in elevation, illustrating the pipe coupling of this invention constructed for general pipeline installation.

As shown in FIG. 1, the pipe coupling of this invention provides a sealed connection between the adjacent ends of pipes 10 and 11. The coupling includes a central, relatively short, cylindrical member 12 circumscribing the ends of both pipes 10 and 11. Setscrews 13 and 14 extend through threaded radial openings in the member 12 and bear against the peripheries of the pipes 10 and 11. Washers 15 and 16 are positioned adjacent the ends of the cylindrical member 12. Outwardly of the washer 15 is a gasket 17 of resilient material, such as rubber. The gasket 17 includes a radial surface 18 adjacent the radial end surface of the washer 15, and an outer surface that includes a tapering portion 19 that connects to a relatively narrow radial end wall 20. The surface 19, therefore, tapers axially and radially inwardly relative to the pipe 10. The inner surface 21 of the gasket 17 is cylindrical and generally complementary to the periphery of the pipe 10. The outer surface 22, between the tapered portion 19 and the radial wall 18, also is cylindrical.

A second gasket 24 is provided outwardly of the washer 16, circumscribing the end portion of the pipe 11. The gasket 24 includes cylindrical inner and outer walls 25 and 26, respectively, and a radial end wall 27 adjacent the radial surface of the washer 16. The outer end wall of the gasket 24 includes a surface 28 that tapers inwardly toward the wall of the pipe 11 in a direction axially inwardly of the pipe 11. At its radial outer portions, however, the end wall of the gasket 24 includes a section 29 tapering in the opposite direction away from pipe 11.

The central cylindrical member 12, the washers 15 and 16, and the gaskets 17 and 24 are circumscribed by a sleeve 31.

The sleeve includes a cylindrical portion 32, which along its undersurface is generally complementary to the surfaces 22 and 26 of the gaskets 17 and 24, respectively. The sleeve 31 also includes an inwardly tapered wall 33 connecting at its axially outer portions to a short radial wall 34. The walls 33 and 34 of the sleeve 31 complementarily engage the tapered surface 19 and the radial end surface 20 of the gasket 17.

At its opposite end, the sleeve 31 is provided with a radially outwardly extending flange 36 welded to it.

Axially beyond the gasket 24 (to the right as shown) is a ring 38, which has an inner cylindrical surface 39 adjacent the periphery of the pipe 11, and an outer cylindrical surface 40 slidably received within the cylindrical portion 32 of the sleeve 31. The end 41 of the ring 38 adjacent the gasket 24 is substantially complementary to the end surfaces 28 and 29 of the gasket.

The opposite end of the ring 38 is notched to provide radial and circumferential shoulders 42 and 43, respectively. This provides a recess for a radial flange 44. The latter member is provided with openings through which extend screws 45 that are received within threaded openings in the flange 36 that is attached to the sleeve 31.

In installing the coupling shown in FIG. 1, the central cylindrical member 12 first is positioned around the adjacent ends of the pipes 10 and 11. The setscrews 13 and 14 then are tightened to bear against the peripheries of the pipe ends, thereby providing a temporary attachment that holds the pipes together. Then, the remaining components of the coupling are assembled in the manner illustrated in FIG. 1. Following this, the screws 45 are tightened. As a result, the flange 44, reacting through the shoulder 42 of the member 38, exerts a force on the gasket 24 biasing it toward the end of the pipe 11, or to the left as the device is shown. At the same time, the tightening of the screws in the flange 36 biases the sleeve 31 to the right as the device is shown. This causes the walls 33 and 34 of the member 31 to bear against the gasket 17 and urge it toward the end of the pipe 10. Neither gasket can be moved, however, because of the abutment provided by the central assembly of the washers 15 and 16 backed up by the cylindrical member 12. Therefore, both gaskets 17 and 24 are compressed axially as the screws 45 are tightened. The force on the gasket 17 causes it to become wedged beneath the inclined wall 33 of the member 31. Therefore, the gasket 17 is forced inwardly into tight sealing engagement with the periphery of the pipe 10. Also, it it wedged against the inner surfaces of the sleeve 31 so that it becomes sealed relative to that member.

When the end wall 41 of the ring 38 is forced against the gasket 24, it reacts against the inclined surface 28, wedging portions of the gasket 24 inwardly into sealing engagement with the surface of the pipe 11. Simultaneously, the end wall 41 bears against the outwardly tapered surface 29 of the gasket 24, causing it to become wedged outwardly against the inner surface of the cylindrical portion 32 of the sleeve 31. Consequently, the gasket 24 becomes sealed relative to the inner surface of the sleeve 31.

In this manner, it is possible to load both gaskets 17 and 24 and to seal all potential outlets for fluid. Although there is relative movement of the parts 31 and 38, these two members, as well as the pipes, are effectively sealed by only two gaskets. The gaskets are wedged firmly beneath the inclined surfaces of the members 31 and 38 so that they will withstand extremely high pressures within the pipes 10 and 11 without permitting leakage. Such pressures are exerted against the inner portions of the gaskets 17 and 24. This only wedges them more tightly into the recesses provided by the members 31 and 38. Pressure, therefore, is used advantageously to enhance the sealing effect.

Figure 2:
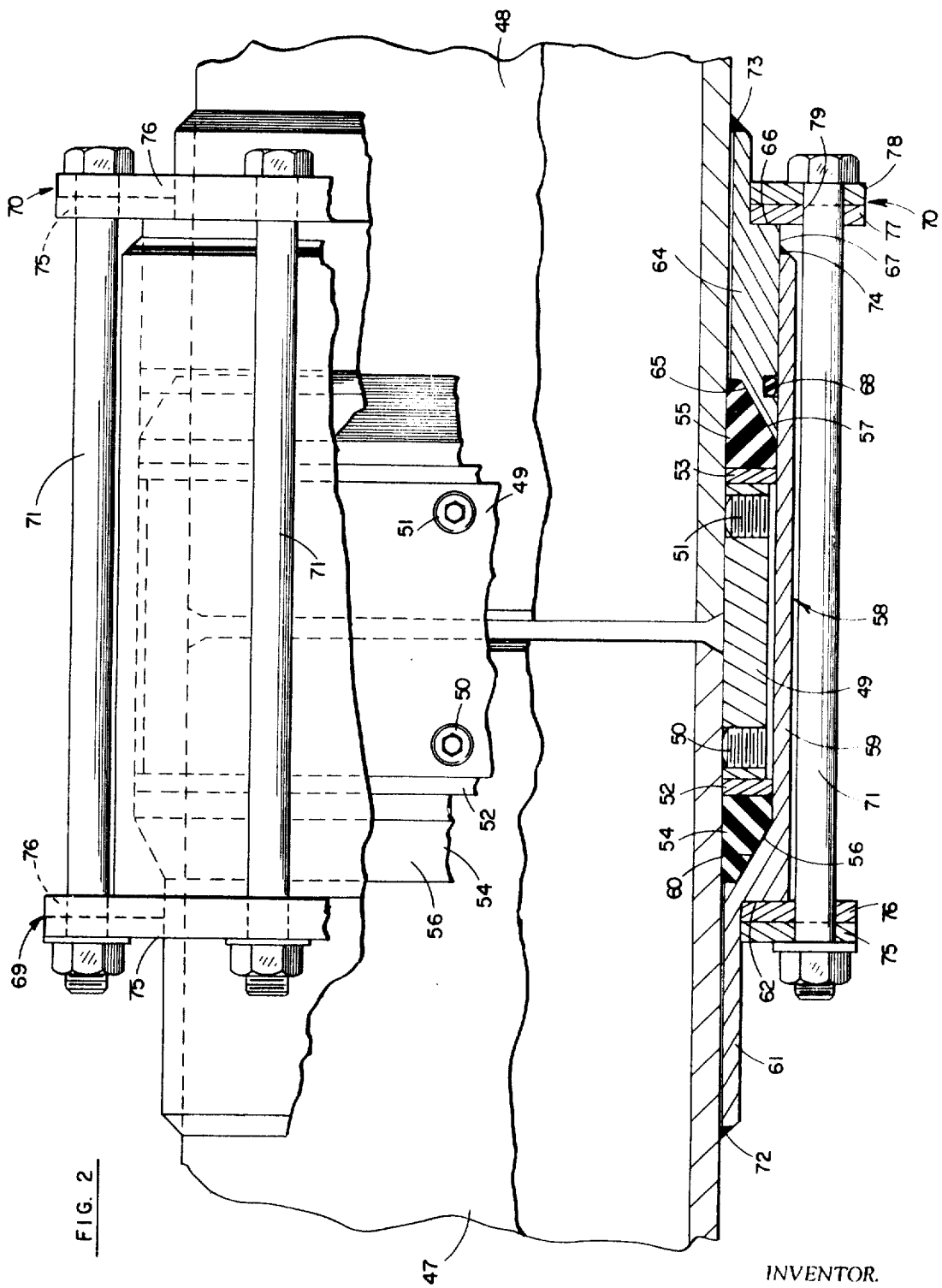
FIG. 2 is a longitudinal sectional view, partially in elevation, of a version of the coupling designed for a welded installation.

The coupling embodiment shown in FIG. 2 is particularly adapted for use in repair work for oil refineries. This coupling, illustrated as connecting together the ends of pipes 47 and 48, includes a central, short, cylindrical member 49 that carries setscrews 50 and 51, which engage the outer surfaces of the pipes 47 and 48 in forming a temporary attachment. Washers 52 and 53 are at the ends of the cylindrical member 49, beyond which are wedge-shaped gaskets 54 and 55, similar to the gasket 17 of the embodiment of FIG. 1. These gaskets include tapered outer surfaces 56 and 57. A sleeve 58 circumscribes these elements. This sleeve includes a cylindrical portion 59 outwardly of the central cylindrical member 49 and the gaskets 54 and 55. The sleeve 58 also includes a tapered surface 60 complementarily engaging the tapered surface 56 of the gasket 54. Beyond this, the end portion 61 of the sleeve 58 is of reduced diameter and lies close to the surface of the pipe 47. This provides a radial exterior shoulder 62.

At the opposite end of the coupling is a ring 64 having a tapered end surface 65 that complementarily engages the tapered surface 57 of the gasket 55. The outer end portion of the ring 64 is of reduced diameter so that a radial shoulder 66 is provided. The outer cylindrical surface 67 of the member 64 is slidably received inside the end of the cylindrical portion 59 of the sleeve 58. An annular groove is provided in the cylindrical surface 67 of the member 64 for receiving an O-ring 68. The inner surface of the cylindrical portion 59 of the member 58 may be coated with Teflon, a trademark of E. I. duPont deNemours & Co., Inc., Wilmington, Del., for polytetrafluorethylene, to facilitate movement of the O-ring 68 along this surface.

At the opposite ends of the coupling, bearing against the shoulders 62 and 66, are annular flanges 69 and 70. Apertures are provided through the flanges 69 and 70 and elongated bolts 71 extend through these apertures and interconnect the flanges.

The initial step in assembling the coupling is similar to that described above for the embodiment of FIG. 1, with the cylindrical member 49 first being positioned around the pipe ends and the setscrews 50 and 51 tightened to effect the temporary attachment. The remaining components of the coupling then are brought into the position shown in FIG. 2. The bolts 71 then are tightened, causing inwardly directed forces to be exerted against the gaskets 54 and 55. As the sleeve 58 is biased to the right, as the device is shown in FIG. 2, the tapered surface 60 of the sleeve member bears against the tapered surface 56 of the gasket 54, wedging the gasket beneath it and squeezing it tightly against the periphery of the pipe 47 and the interior of the sleeve 58. This provides a seal at the left-hand end of the coupling, preventing leakage exteriorly of the pipe 47.

At the same time, the tapered surface 65 of the ring 64 bears against the tapered surface 57 of the gasket 55, compressing the latter member inwardly to seal tightly around the pipe 48. This assures that no leakage will occur beneath the gasket 55. The compression of the gasket 55 will cause some bulging outwardly against the inner surface of the cylindrical portion 59 of the sleeve 58. However, the gasket 55 is wedged inwardly by the tapered surface 65 of the member 64, so that the principal effect is to contract the gasket 55 around the exterior of the pipe 48. Therefore, in order to assure that there is a seal between the sleeve 58 and the ring 64, the O-ring 68 is included. This O-ring seal will withstand high pressures, irrespective of the fact that it is not compressed as are the gaskets 54 and 55. This is because the sleeve member 58 may be made with a relatively smooth interior surface which the O-ring 68 engages. However, the exteriors of the pipes 47 and 48 will be rough, so that, in order for a seal to be accomplished, it is necessary to have a tight compressive force on a gasket member as is provided for the gaskets 54 and 55.

After the bolts 71 have been tightened to load the gaskets 54 and 55, welds 72 and 73 are made at the outer ends of the sleeve section 61 and the ring 64. The sleeve ends are spaced well outwardly of the gaskets 54 and 55 so that the heat of the welding operation will not damage the gaskets. The welds 72 and 73 hold the sleeve 58 and the ring 64 in the position where they compress the gaskets 54 and 55. After this has been done, the bolts 71 are removed. An additional weld 74 is made between the end of the sleeve member 68 and the ring 64.

Figure 3:
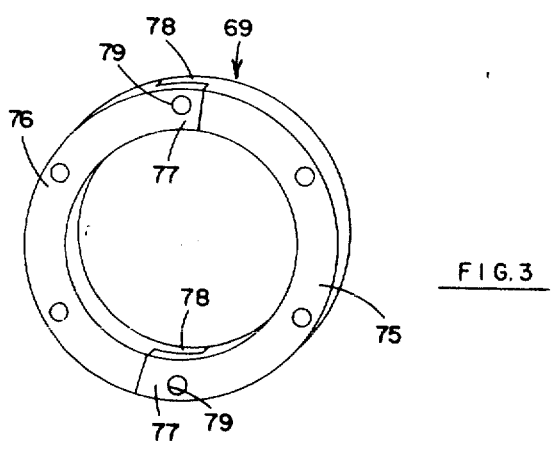
FIG. 3 is a perspective view, partially broken away, of the flange engaged by the screws in compressing the gaskets in the coupling of FIG. 2.

Preferably, the flanges 69 and 70 are of two-piece construction so that they may be removed after the welds 72, 73 and 74 are made. The flanges are similar, with the flange 69 being shown in perspective in FIG. 3. It is made up of identical sections 75 and 76 of generally semicircular shape having adjacent ends 77 and 78 which are recessed circumferentially. This provides the ends 77 and 78 with projections that complementarily mate together. Drilled openings 79 for receiving the bolts 71 extend through the overlapping ends 77 and 78, which locks the flange sections 75 and 76 together when installed. The flanges 69 and 70 are reusable in effecting the attachment of other couplings.

As with the previously described embodiment, therefore, the attachment of the coupling is accomplished rapidly and easily, and, additionally, the parts employed for compressing it axially are easily removed for reuse when the coupling ends are welded. Internal pressures help the gaskets 54 and 55 to be wedged within their recesses, increasing the sealing effect. When the coupling is completed, therefore, the setscrews for the temporary attachment are covered and retained by the sleeve 58. The external bolts 71 are completely removed from the assembly. This contrasts with the coupling heretofore used, in which it has been necessary to cut off the heads of both the sets of screws used in loading the gaskets and in forming the temporary attachment for the pipe ends, followed by welding at each screw opening.

Figure 4:
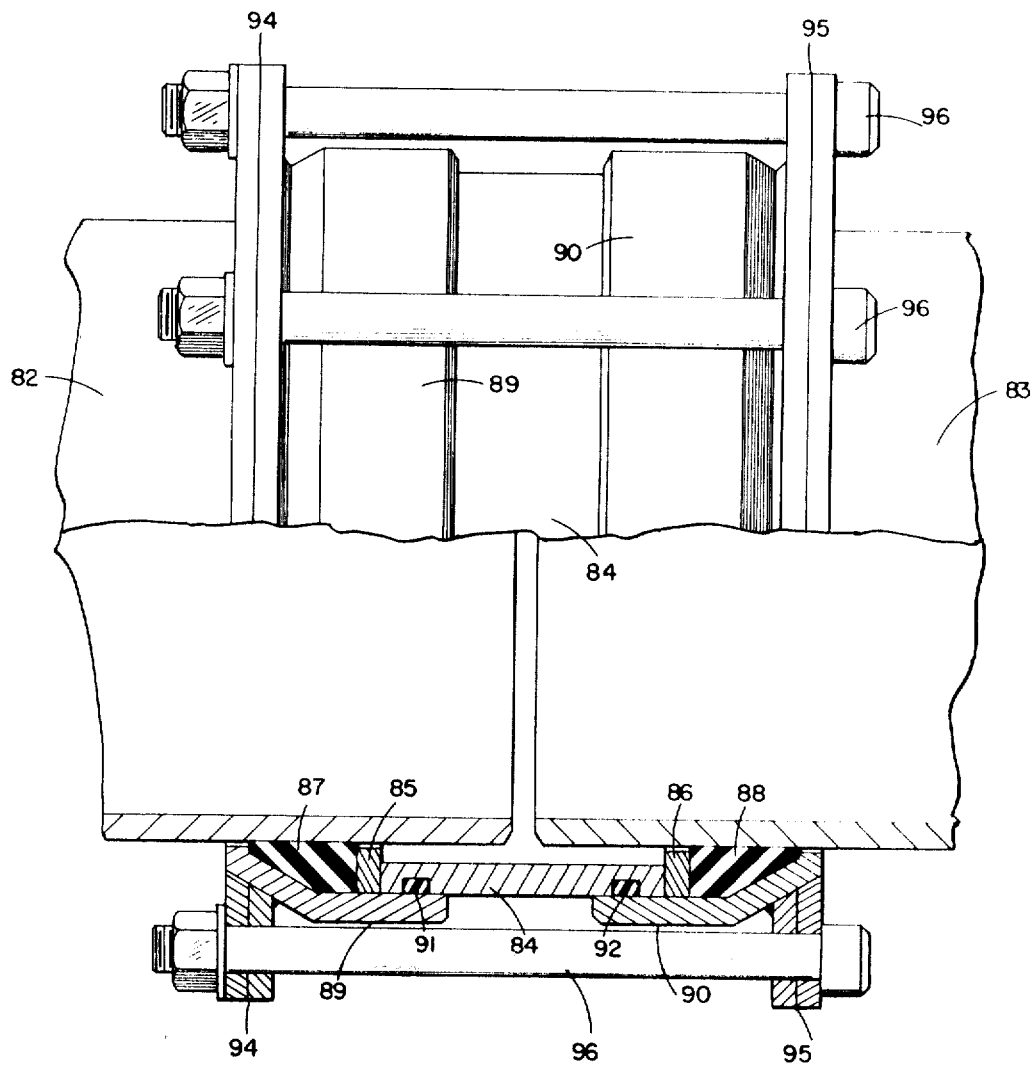
FIG. 4 is a longitudinal sectional view, partially in elevation, of the coupling for general utility, where the bolts are used in securing the coupling together.

The embodiment of the coupling illustrated in FIG. 4 is intended for general service. In providing a sealed connection between the ends of pipes 82 and 83, the coupling of FIG. 4 includes a short, central cylindrical member 84, at the ends of which are washers 85 and 86. Beyond the washers are wedge-shaped resilient gaskets 87 and 88, similar to the wedge-shaped gaskets described above. Annular members 89 and 90 circumscribe the gaskets 87 and 88 and overlap the ends of the central cylindrical member 84. The outer end portions of the members 89 and 90 are tapered for engaging the tapered surfaces of the gaskets 87 and 88. Inwardly, where they overlap the cylindrical member 84, the members 89 and 90 are cylindrical. The end portions of the central member 84 are provided with grooves which receive O-rings 91 and 92 for providing seals along the inner surfaces of the members 89 and 90. At the same time, the O-rings will allow relative movement between the members 89 and 90 and the central cylindrical member 84. Teflon coatings on the inner surfaces of the members 89 and 90 will facilitate any such movement and prevent adhesion of the O-rings to the metal.

Flanges 94 and 95 are provided on the ends of the members 89 and 90. These are apertured to receive bolts 96. Therefore, when the coupling is installed, the bolts 96 are tightened, biasing the members 89 and 90 toward each other. This compresses the tapered gaskets 87 and 88, causing them to be wedged tightly against the surfaces of the pipes 82 and 83 to accomplish seals therewith. Also, the O-rings 91 and 92 seal against the inner surfaces of the members 89 and 90, assuring that no leakage can occur at the coupling. There is no problem in making the inner surfaces of the members 89 and 90 relatively smooth so that the O-rings will provide effective seals that withstand high internal pressures. At the same time, at the surfaces of the pipes 82 and 83 which are normally rough, there are compressed gaskets to preclude leakage.

An expansion coupling, which allows relative movement of the pipe ends, is provided by the version of the invention shown in FIG. 5. Here, the coupling interconnects the ends of pipe 98 and 99, which may be relatively widely separated. Around the end of the pipe 98 are a wedge-shaped gasket 100, a washer 101 and an annular member 102. These are similar to the gasket 87, washer 85 and annular member 89 of the embodiment of FIG. 4. The member 102 includes a cylindrical portion which extends beyond the washer 101. A cylindrical sleeve 103 is received within the end of the annular member 102 and sealed relative to it by an O-ring 104. An annular flange 105 is secured to the outside of the member 102, while a second annular flange 106 is carried by the exterior of the cylindrical sleeve 103. Bolts 107 interconnect the flanges 105 and 106. The gasket 100 is compressed axially, therefore, by tightening of the bolts 107. As this occurs, the tapered outer end of the annular member 102 wedges the gasket 100 tightly against the periphery of the pipe 98. This provides a seal relative to the pipe. The interior of the member 102 is sealed by the O-ring 104, which prevents leakage at this location, while at the same time allowing relative movement between the members 102 and 103 as the gasket is loaded.

Generally similar components are provided around the end of the pipe 99. At that location, there are a wedge-shaped gasket 109, a washer 110 and an annular member 111 for use in loading the gasket. A cylindrical sleeve 112 slidably fits within the member 111 and is sealed by means of an O-ring 113. A flange 114 is provided on the sleeve 112 and an additional flange 115 on the annular member 111. Therefore, by tightening the bolts 116 that extend between the two flanges, the gasket 109 is compressed and caused to wedge against the periphery of the pipe 99. A seal along the relatively smooth interior of the annular member 111 is accomplished by the O-ring 113.

The cylindrical sleeve 112 is slidably received within the sleeve 103. An O-ring 117 is provided around the exterior of the end of the sleeve 112 and provides a seal relative to the member 103. Therefore, by this arrangement, both gaskets 100 and 109 are compressed axially so as to be wedged against the surfaces of the pipes 98 and 99 and seal at those locations. At the same time, the coupling provides tubular members projecting beyond the ends of the pipes and associated in a telescoping relationship. This design not only seals against high internal pressures, but provides considerable latitude in the amount of movement of one pipe relative to the other.

I claim:

1. In combination with a first tubular member and a second tubular member having adjacent ends, a device for sealingly interconnecting said adjacent ends comprising annular means circumscribing said adjacent ends, a first gasket circumscribing said first tubular member, said first gasket having an inner substantially cylindrical surface substantially complementarily engaging the outer surface of said first tubular member, a second gasket circumscribing said second tubular member, said second gasket having an inner substantially cylindrical surface substantially complementarily engaging the outer surface of said second tubular member, said annular means being interposed between and engaging the adjacent ends of said gaskets, said first gasket having a surface remote from said end thereof inclined radially and axially inwardly relative to said first tubular member, said second gasket having a surface remote from said end thereof inclined radially and axially inwardly relative to said second tubular member, a first annular element adjacent said first gasket, said first annular element having a surface inclined radially and axially inwardly relative to said first tubular member and engaging said remote surface of said first gasket, a second annular element adjacent said second gasket, said second annular element having a surface inclined radially and axially inwardly relative to said second tubular member and engaging said remote surface of said second gasket, means for providing a seal between said first and second annular elements, and means for biasing said first and second annular elements relatively toward said annular means for urging said ends of said gaskets against said annular means, and reacting through said remote surfaces of said gaskets to compress said inner surface of each of said gaskets inwardly against the periphery of the tubular member which it circumscribes for effecting a seal therewith.

2. A device as recited in claim 1 in which said annular means includes a central cylindrical portion overlapping the adjacent ends of said tubular members, and a washer at either end of said cylindrical portion, said washers engaging said ends of said gaskets.

3. A device as recited in claim 1 in which said means for biasing said first and second annular elements relatively toward said annular means includes an outwardly projecting flange associated with either of said annular elements, and threaded means interconnecting said flanges for moving said flanges toward each other upon rotation of said threaded means.

4. A device as recited in claim 2 in which at least one said annular elements includes an extension overlapping said annular means, said means for providing a seal between said first and second annular elements including a seal interposed between said annular means and either of the overlapping portions of said annular members.

5. A device as recited in claim 4 in which said annular means is cylindrical, said extensions of said annular elements are cylindrical, and in which each of said seals is an O-ring, said annular means having a circumferential groove in the outer surface thereof for each of said O-ring.